No. 621,230. Patented Mar. 14, 1899.
E. J. DOLAN.
ACETYLENE GENERATING LAMP.
(Application filed Oct. 5, 1898.)

(No Model.)

Witnesses:
Henry Drury
R. M. Kelly

Inventor:
Edw. J. Dolan
By his atty

UNITED STATES PATENT OFFICE.

EDWARD J. DOLAN, OF PHILADELPHIA, PENNSYLVANIA.

ACETYLENE-GENERATING LAMP.

SPECIFICATION forming part of Letters Patent No. 621,230, dated March 14, 1899.

Application filed October 5, 1898. Serial No. 692,672. (No model.)

*To all whom it may concern:*

Be it known that I, EDWARD J. DOLAN, of the city and county of Philadelphia and State of Pennsylvania, have invented an Improvement in Acetylene Bicycle-Lamps, of which the following is a specification.

My invention has reference to acetylene bicycle-lamps; and it consists of certain improvements which are fully set forth in the following specification and shown in the accompanying drawings, which form a part thereof.

My invention comprehends certain improvements in lamp structures especially adapted for bicycles, though they may be employed in lamps of all descriptions.

My object is to provide a more uniform and satisfactory manner of supplying water to the carbid of calcium than has heretofore been employed, and, furthermore, to provide suitable means whereby the refuse or lime product may be removed or eliminated from the undecomposed carbid of calcium.

In carrying out my invention I provide a lamp structure with substantially three compartments, the upper of which is adapted to contain the supply of water, the middle compartment to contain the carbid of calcium and act as the immediate generator of the acetylene, and the lowermost being the chamber for receiving the refuse or lime product. The burner opens from the intermediate chamber or that in which the carbid is placed. Interposed between the middle and lower chambers I arrange a rotatable grate adapted to be operated by a spindle extending to the outside and preferably through the bottom of the lower compartment. This grate supports the carbid of calcium and at the same time upon revolution scrapes off or removes the lime product from the lower portion of the said carbid. It furthermore distributes the carbid so as to present new portions to be acted upon by the water. The water is permitted to drop from the upper compartment by a suitable needle or other valve, and instead of being allowed to fall directly upon the top of the carbid of calcium it is conveyed downward by means of a flexible conductor, preferably in the form of one or more small chains. By this means the water is caused to flow uniformly and in a steady minute stream upon the carbid and be distributed thereon.

My invention will be better understood by reference to the accompanying drawings, in which—

Figure 1:
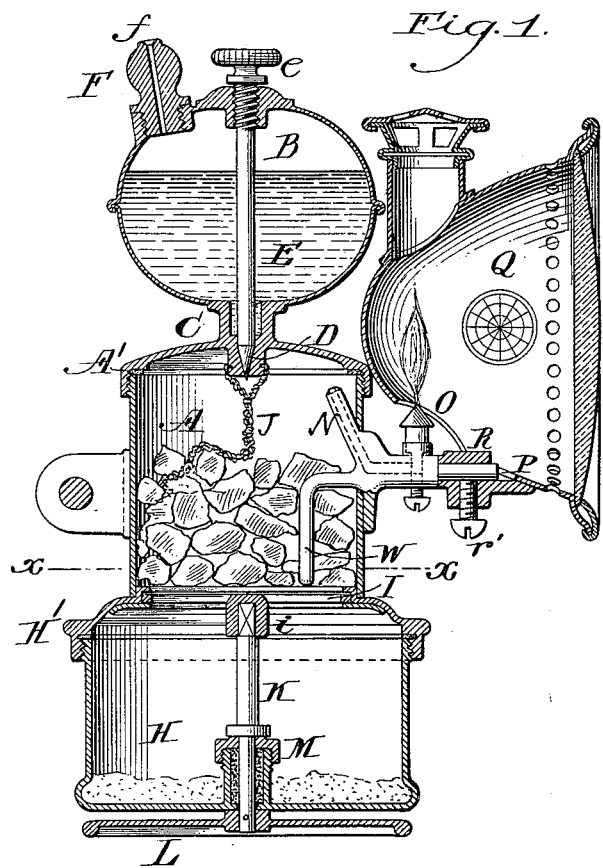
Figure 2:
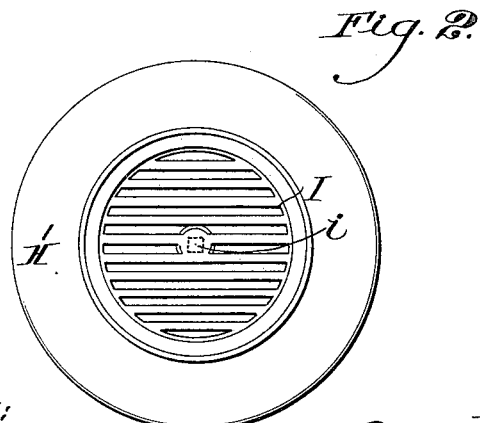

Figure 1 is a sectional elevation of an acetylene-lamp embodying my improvements, and Fig. 2 is a cross-sectional plan of same on line *x x*.

A is the chamber containing the carbid of calcium and has a removable gas-tight cap A'. Arranged above the chamber A is the water-chamber B, connected at the bottom with the said cap by a neck C, having at the lower end a valve-seat D, upon which a valve-rod E seats itself. The valve-rod extends through the upper part of the chamber B, being adjustable therein by a screw-thread and terminating in a small handle *e*, whereby it may be adjusted to control the rate of flow of the water from the compartment B into the carbid-compartment of chamber A. The water-chamber B is further provided with a removable plug F, fitting an aperture, through which the chamber may be supplied with water, and this plug is preferably provided with a small aperture *f*, through which any acetylene gas finding its way into the chamber B may readily escape.

The lower part of the chamber A terminates in a cap H', which screws upon the top of the lower compartment H by a gas-tight joint. Fitted at the base of the chamber A and with provision for rotary movement is a grate I, having a central hub *i*, formed with a square or other-shaped aperture. A spindle K has a square or otherwise-formed upper end adapted to the aperture of the hub *i* of the grate, so that by rotating the spindle K the grate is correspondingly moved. The lower part of the spindle K extends through a stuffing-box M in the bottom of the chamber H and is provided with a large hand-wheel L, preferably of a diameter equal to the diameter of the chamber H, so that the spindle may be readily turned when desired. The hand-wheel L, being made large in diameter, constitutes a stand or support for the lamp when set down.

The interior of the chamber A is provided with an inwardly-extending finger W, the lower end of which approaches the grate I, the object of said finger being to retard the movement of the carbid when the grate is rotated, so that the proper cleansing action may be secured, as well as the rearrangement of the pieces of carbid placed in the chamber A.

J is a metallic flexible conductor having its upper end connected below the water-nozzle D. In practice I prefer to form this conductor of one or more small flexible chains so attached or supported relatively to the nozzle that the water passing through the same is absorbed by the chains and caused to flow downward in a very steady and small stream. In this manner the generation of gas is very uniform, which is a most important requirement in a lamp for an acetylene having a chamber of small capacity. Without uniform generation of gas the burner is apt to splutter or flare and be very irregular in the intensity of light emitted. By employing the chains or metallic conductor of flexible construction I secure a steady flow of water and do not have any materials which rot or become defective by clogging as a means for securing such flow. If lime should become attached to the chains, the flow of the water tends to dislodge it, and in any event said chains are readily cleansed on opening the lamp. Furthermore, such metallic conductors are indestructible and uniform in their operation.

N is a gas-pipe leading from the chamber A and communicating with the burner O. The burner is provided with a horizontal pin P to receive a sleeve R, carrying the reflector Q and the outer lens. A set-screw $r'$ clamps the reflector and lens in position relatively to the burner. The lamp may be provided with any suitable means for attachment to a bicycle when employed for that purpose. The invention is equally applicable for standing lamps; but in such cases it is preferable to modify or change the general design so as to bring the burner to the upper part of the lamp; but this is a mere matter of detail which does not change or modify the invention herein described. I would point out that the lower compartment H, while specially designed for receiving the lime and holding it out of contact with the undecomposed carbid, also acts as a gas-reservoir to increase the capacity of the lamp for holding acetylene which may be generated, since such gas will fill the lower compartment, as well as the compartment A, and will thereby insure a more steady flame.

While the use of metal in the flexible conductor J has many advantages over organic or vegetable fibrous substances and I therefore prefer to employ it, nevertheless I do not confine myself to the use of metal. My improvement comprehends the use of a flexible conductor arranged below the water nozzle or inlet or so supported that it receives the water and distributes it to the carbid. By making the conductor flexible it adapts itself to the carbid in the chamber and at all times rests upon it. Furthermore, the flexibility of the conductor enables the parts to be screwed together or removed without difficulty, since the conductor J forms no rigid interference with the carbid. This flexible conductor may be held in position below the nozzle in any suitable manner.

I would point out that while the grate only acts upon the lower parts of the carbid the rotation of said grate causes the carbid to readjust itself, and this brings to the bottom pieces of carbid containing lime upon its surface. By proper manipulation I am enabled to remove the objectionable portions or excess of lime refuse from the carbid-chamber.

While I prefer the construction shown, I do not limit myself to the minor details, as these may be changed or modified without departing from the principles of my invention.

Having now described my invention, what I claim as new, and desire to secure by Letters Patent, is—

1. In an acetylene-lamp, the combination of an upper and lower compartment detachably connected, combined with a grate interposed between said compartments and directly supported by the upper compartment, a burner leading from the upper compartment, a vertical spindle loosely and detachably connected with and extending from the grate through the bottom of the lower compartment and provided with means upon the under side thereof for rotating it whereby the grate may be rotated or the spindle detached from the grate for cleansing, and means to supply water in limited quantities to the upper compartment.

2. In an acetylene-lamp the combination of an upper and lower compartment, combined with a grate interposed between said compartments and supported at its perimeter or outer edge, a burner leading from the upper compartment, a vertical spindle detachably connected with and extending from the grate through the bottom of the lower compartment and provided with means upon the outside thereof for rotating it, means to supply water in limited quantities to the upper compartment consisting of a water-chamber provided with a nozzle, and a loose flexible unconfined metallic conductor leading directly from below the nozzle into the central portion of the upper chamber at a point above the grate.

3. In an acetylene-lamp, the combination of an upper and lower compartment, combined with a grate interposed between said compartments, a burner leading from the upper compartment, a vertical spindle extending from the grate through the lower compartment and provided with means upon the outside thereof for rotating it, a water-compartment opening into the top of the first-mentioned or upper compartment, a valve to control the supply of water to said compartment, and one or more flexible chains connected at their upper ends adjacent to the valve to directly receive the water passing through the same and extending downward into the first-mentioned or upper compartment containing the carbid.

4. In an acetylene-lamp, the combination of an upper and lower compartment, combined with a grate interposed between said compartments, a burner leading from the upper compartment, a vertical spindle extending from the grate through the lower compartment and provided with means upon the outside thereof for rotating it, means to supply water in limited quantities to the upper compartment, and an inwardly-extending projection or obstruction located in the upper compartment above the grate for retarding the rotation of the carbid when the grate is rotated.

5. The combination of a carbid-chamber having a burner opening therefrom, a box-shaped refuse-chamber detachably secured at its upper part to the lower part of the carbid-chamber, a rotatable grate having its rim carried by the carbid-chamber and interposed between the carbid and refuse chambers, means to rotate it on an axis at approximately right angles to the plane of the grate extending to the outside of the bottom of the refuse-chamber, and means to supply water in limited quantities to the upper part of the carbid-chamber.

6. The combination of a carbid-chamber having a burner opening therefrom, a box-shaped refuse-chamber detachably secured at its upper part to the lower part of the carbid-chamber, a rotatable grate supported by the carbid-chamber and so as to be interposed between the carbid and refuse chambers, a shaft carried by the refuse-chamber rotatable on an axis at approximately right angles to the plane of the grate and extending to the outside of the refuse-chamber and also forming a detachable operative connection with the central portion of the grate to rotate it, a water-compartment detachably secured to the upper part of the carbid-compartment, a valve to control the supply of water from the water-compartment into the carbid-compartment, and a loose flexible metallic conductor unconfined from the outside to convey the water so supplied directly from the valve to the carbid contained within the carbid-chamber.

7. The combination of a carbid-chamber having a burner opening therefrom, a refuse-chamber detachably secured to the lower part of the carbid-chamber, a rotatable grate interposed between the carbid and refuse chambers and rotatable on an axis at approximately right angles to the plane of the grate, a vertical spindle detachably connected with the grate and extended through a stuffing-box in the lower part of the refuse-chamber, a wheel for operating the spindle of large diameter below the refuse-chamber and adapted to also perform the function of a stand.

8. In an acetylene-lamp the combination of a chamber adapted to contain carbid of calcium, a burner leading from said chamber, a valve, a water-supply nozzle opening into the upper part of said chamber, and a loose flexible unconfined metallic conductor leading from immediately below said nozzle downward into the interior of the carbid-chamber and of such length as to remain in contact with the carbid as it becomes decomposed.

9. In an acetylene-lamp the combination of a chamber adapted to contain carbid of calcium, a burner leading from that said chamber, a valve, a water-supply nozzle opening into the upper part of said chamber, and a loose flexible unconfined metallic conductor leading from immediately below said nozzle and extending downward into the interior of the carbid-chamber and composed of one or more small flexible chains.

10. In an acetylene-lamp the combination of a chamber to contain carbid, a burner leading therefrom, a water-chamber above the carbid-chamber, a valve and nozzle to control the flow of water, and a loose flexible metallic conductor extending from the nozzle into the carbid-chamber and consisting of a series of independent links loosely linked together and each free to move under the action of gravity.

In testimony of which invention I hereunto set my hand.

EDWARD J. DOLAN.

Witnesses:
ARTHUR E. NITZSCHE,
NELLIE CRANKSHAND.